(12) United States Patent
Wakafuji et al.

(10) Patent No.: US 10,230,449 B2
(45) Date of Patent: Mar. 12, 2019

(54) WIRELESS TERMINAL, COMPUTER READABLE MEDIUM STORING APPLICATION PROGRAM, AND METHOD

(71) Applicant: NEC Corporation, Minato-ku, Tokyo (JP)

(72) Inventors: Kenji Wakafuji, Tokyo (JP); Shigeru Asai, Tokyo (JP); Hideto Shibouta, Tokyo (JP); Masakazu Ono, Tokyo (JP); Shingo Watanabe, Tokyo (JP); Masato Kudou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 15/520,446

(22) PCT Filed: Jul. 22, 2015

(86) PCT No.: PCT/JP2015/003669
§ 371 (c)(1),
(2) Date: Apr. 20, 2017

(87) PCT Pub. No.: WO2016/075850
PCT Pub. Date: May 19, 2016

(65) Prior Publication Data
US 2017/0317736 A1    Nov. 2, 2017

(30) Foreign Application Priority Data

Nov. 11, 2014    (JP) .................................. 2014-228987

(51) Int. Cl.
*H04L 12/801*    (2013.01)
*H04L 5/14*    (2006.01)
(Continued)

(52) U.S. Cl.
CPC .......... *H04B 7/15* (2013.01); *H04M 1/72522* (2013.01); *H04W 48/16* (2013.01);
(Continued)

(58) Field of Classification Search
CPC combination set(s) only.
See application file for complete search history.

(56) References Cited

U.S. PATENT DOCUMENTS

| 6,847,610 B1 * | 1/2005 | Suumaki ............... H04L 47/762 |
| | | 370/230.1 |
| 2005/0037751 A1 | 2/2005 | Kim et al. |

(Continued)

FOREIGN PATENT DOCUMENTS

| JP | 2008-252187 A | 10/2008 |
| JP | 2013-162377 A | 8/2013 |

(Continued)

OTHER PUBLICATIONS

Canadian Office Action for CA Application No. CA2967258 dated Feb. 9, 2018.

(Continued)

*Primary Examiner* — Faruk Hamza
*Assistant Examiner* — Abusayeed M Haque

(57) ABSTRACT

A processor (102) implemented in a wireless terminal (1) is configured to perform gateway processing by executing a first application program (34) stored in a memory (19). The gateway processing includes: (a) receiving transmission data of other application programs (31-33); (b) selecting, from a plurality of communication interfaces (51-55), at least one communication interface to which the transmission data is to be transmitted; and (c) sending the transmission data to the selected at least one communication interface. This contributes, for example, to allowing an application program to easily communicate via a communication interface (i.e., communication path) conforming to a communication protocol that is additionally installed on a wireless terminal (e.g., smartphone).

17 Claims, 4 Drawing Sheets

(51) Int. Cl.
  *H04W 84/18* (2009.01)
  *H04L 12/28* (2006.01)
  *H04B 7/15* (2006.01)
  *H04W 48/16* (2009.01)
  *H04W 88/06* (2009.01)
  *H04M 1/725* (2006.01)
  *H04W 88/16* (2009.01)

(52) U.S. Cl.
  CPC ............ *H04W 88/06* (2013.01); *H04W 84/18* (2013.01); *H04W 88/16* (2013.01)

(56) References Cited

U.S. PATENT DOCUMENTS

| | | |
|---|---|---|
| 2009/0129316 A1 | 5/2009 | Ramanathan et al. |
| 2009/0196170 A1 | 8/2009 | Ayyagari et al. |
| 2012/0084364 A1* | 4/2012 | Sivavakeesar ...... H04L 12/1818 709/205 |
| 2012/0127994 A1* | 5/2012 | Ko .................... H04L 12/18 370/390 |
| 2013/0103765 A1 | 4/2013 | Papakipos et al. |
| 2013/0268414 A1* | 10/2013 | Lehtiniemi ............ G06Q 30/06 705/27.2 |
| 2013/0272286 A1 | 10/2013 | Sharma et al. |
| 2015/0002872 A1* | 1/2015 | Naruse ............... H04N 1/00217 358/1.13 |
| 2015/0003417 A1 | 1/2015 | Akiyoshi et al. |
| 2015/0305074 A1 | 10/2015 | Fujita et al. |

FOREIGN PATENT DOCUMENTS

| | | |
|---|---|---|
| JP | 2014-053719 A | 3/2014 |
| KR | 20110041204 A | 4/2011 |
| WO | 2014/061314 A1 | 4/2014 |

OTHER PUBLICATIONS

International Search Report for PCT Application No. PCT/JP2015/003669, dated Oct. 13, 2015.
Extended European Search Report for EP Application No. EP15858285.8 dated Jun. 28, 2018.

* cited by examiner

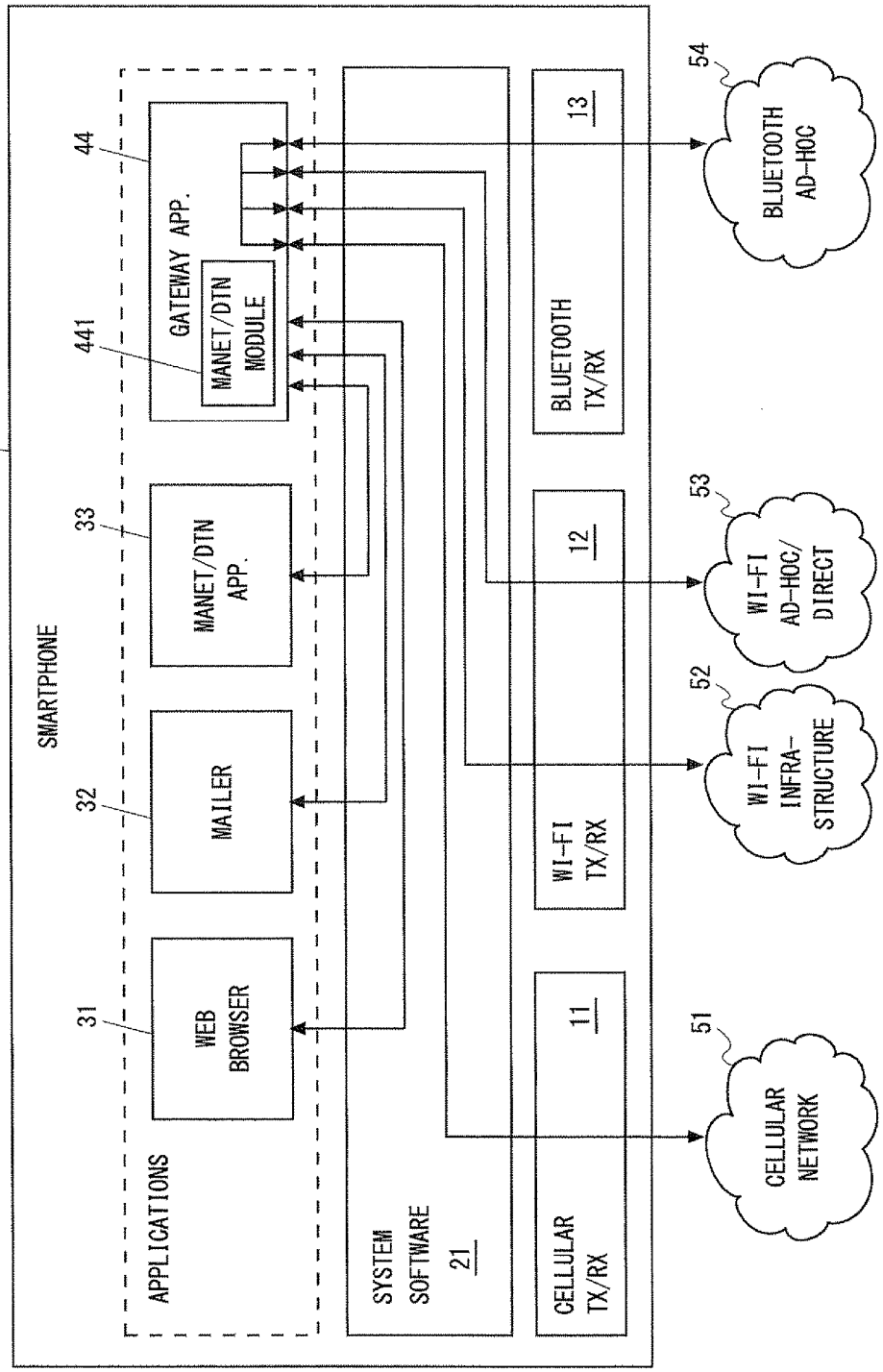

WIRELESS TERMINAL, COMPUTER READABLE MEDIUM STORING APPLICATION PROGRAM, AND METHOD

This application is a National Stage Entry of PCT/JP2015/003669 filed on Jul. 22, 2015, which claims priority from Japanese Patent Application 2014-228987 filed on Nov. 11, 2014, the contents of all of which are incorporated herein by reference, in their entirety.

TECHNICAL FIELD

The disclosure of this specification relates to a wireless terminal and, more specifically, to a selection of a communication interface by a wireless terminal.

BACKGROUND ART

Wireless terminals such as smartphones can be used for a wireless multi-hop network (see, for example, Patent Literature 1 and 2). The wireless multi-hop network is a mobile ad-hoc network (MANET), a disruption tolerant network (DTN), or a combination thereof. The disruption tolerant network may also be referred to as a delay tolerant network or a disconnect tolerant network. Disruption/delay/disconnect tolerant networks are herein referred to collectively as DTN. The MANET is typically based on the premise that there is a communication path between a source node and a destination node. Specific examples of the MANET include, for example, Bluetooth (registered trademark), ZigBee (registered trademark), ZigBee PRO, ZigBee IP, and Wi-Fi ad-hoc mode (IEEE 802.11). On the other hand, the DTN is based on the premise that a temporary or intermittent communication disconnection occurs. In other words, the DTN is based on the premise that there is no stable communication path between a source node and a destination node at least at one point. In order to deal with the temporary or intermittent communication disconnection, each DTN node performs a store-and-forward operation. In this sense, the DTN can be referred to as a store-and-forward type wireless multi-hop network.

CITATION LIST

Patent Literature

[Patent Literature 1] U.S. Patent Application Publication No. 2013/0103765
[Patent Literature 2] U.S. Patent Application Publication No. 2013/0272286

SUMMARY OF INVENTION

Technical Problem

Many types of wireless terminals such as smartphones are equipped with multiple wireless communication hardware devices (wireless transceivers) and support multiple wireless communication standards. Commercially available smartphones are equipped with, for example, a cellular transceiver such as Wideband Code Division Multiple Access (W-CDMA)/Long Term Evolution (LTE), a Wi-Fi transceiver such as IEEE802.11a/b/g/n, and a Bluetooth transceiver.

The present inventors have conducted various studies about use of wireless terminals such as smartphones for the wireless multi-hop network and have found various problems. First, in some commercially available smartphones, existing applications such as a WEB browser and a mailer (e.g., pre-installed standard applications on these smartphones) cannot communicate via a communication interface (a communication path) that conforms to a communication protocol (e.g., the MANET or the DTN) additionally installed on the smartphones later. More specifically, in some commercially available smartphones, the MANET or DTN is not a default application. Accordingly, in order to use a communication interface conforming to the MANET or DTN that is not supported by a smartphone in its default setting, it is required to install, on these smartphones, a program that provides communication protocols necessary for the MANET or DTN. However, in some commercially available smartphones, system software or the like prevents the pre-installed applications from communicating via a communication interface that conforms to the post-installed communication protocol (e.g., the MANET or the DTN).

One of the objects to be attained by embodiments disclosed herein is to provide a wireless terminal, an application program, and a method that are modified to allow an application program to easily communicate via a communication interface (communication path) conforming to a communication protocol (e.g., MANET or DTN) that is additionally installed on the wireless terminal. It should be noted that this object is merely one of the objects to be attained by the plurality of embodiments disclosed herein. The other objects or problems and novel characteristics will be made apparent from the following descriptions and accompanying drawings.

Solution to Problem

In one embodiment, a wireless terminal includes a plurality of communication interfaces, a memory, and a processor. The processor is configured to execute gateway processing by executing a first application program stored in the memory. The gateway processing includes: (a) receiving transmission data of another application program; (b) selecting, from the plurality of communication interfaces, at least one communication interface to which the transmission data is to be transmitted; and (c) sending the transmission data to the at least one communication interface.

In one embodiment, when executed by a computer implemented in a wireless terminal, an application program causes the computer to execute gateway processing. The gateway processing includes: (a) receiving transmission data of another application program; (b) selecting, from a plurality of communication interfaces that are available in the wireless terminal, at least one communication interface to which the transmission data is to be transmitted; and (c) sending the transmission data to the at least one communication interface.

In one embodiment, a method, which is performed by a computer implemented in a wireless terminal upon executing, by the computer, an application program, includes: (a) receiving transmission data of another application program; (b) selecting, from a plurality of communication interfaces that are available in the wireless terminal, at least one communication interface to which the transmission data is to be transmitted; and (c) sending the transmission data to the at least one communication interface.

Advantageous Effects of Invention

According to the aforementioned embodiments, it is possible to provide a wireless terminal, an application program, and a method that is modified to allow an application program to easily communicate via a communication interface (communication path) conforming to a communication protocol (e.g., a MANET or a DTN) that is additionally installed on the wireless terminal. It should be noted that this effect is merely one of the effects expected to be brought about by the embodiments disclosed herein.

BRIEF DESCRIPTION OF DRAWINGS

FIG. 4 is a block diagram showing a software configuration example of a wireless terminal according to a second embodiment.

DESCRIPTION OF EMBODIMENTS

Specific embodiments will be described hereinafter in detail with reference to the drawings. The same or corresponding elements are denoted by the same symbols throughout the drawings, and repetitive descriptions thereof are avoided for the sake of clarity.

Each of embodiments described below may be implemented independently or in combination with any other. These embodiments include novel characteristics different from one another. Accordingly, these embodiments contribute to achieving objects or solving problems different from one another and contribute to obtaining advantages different from one another.

First Embodiment

Figure 1:
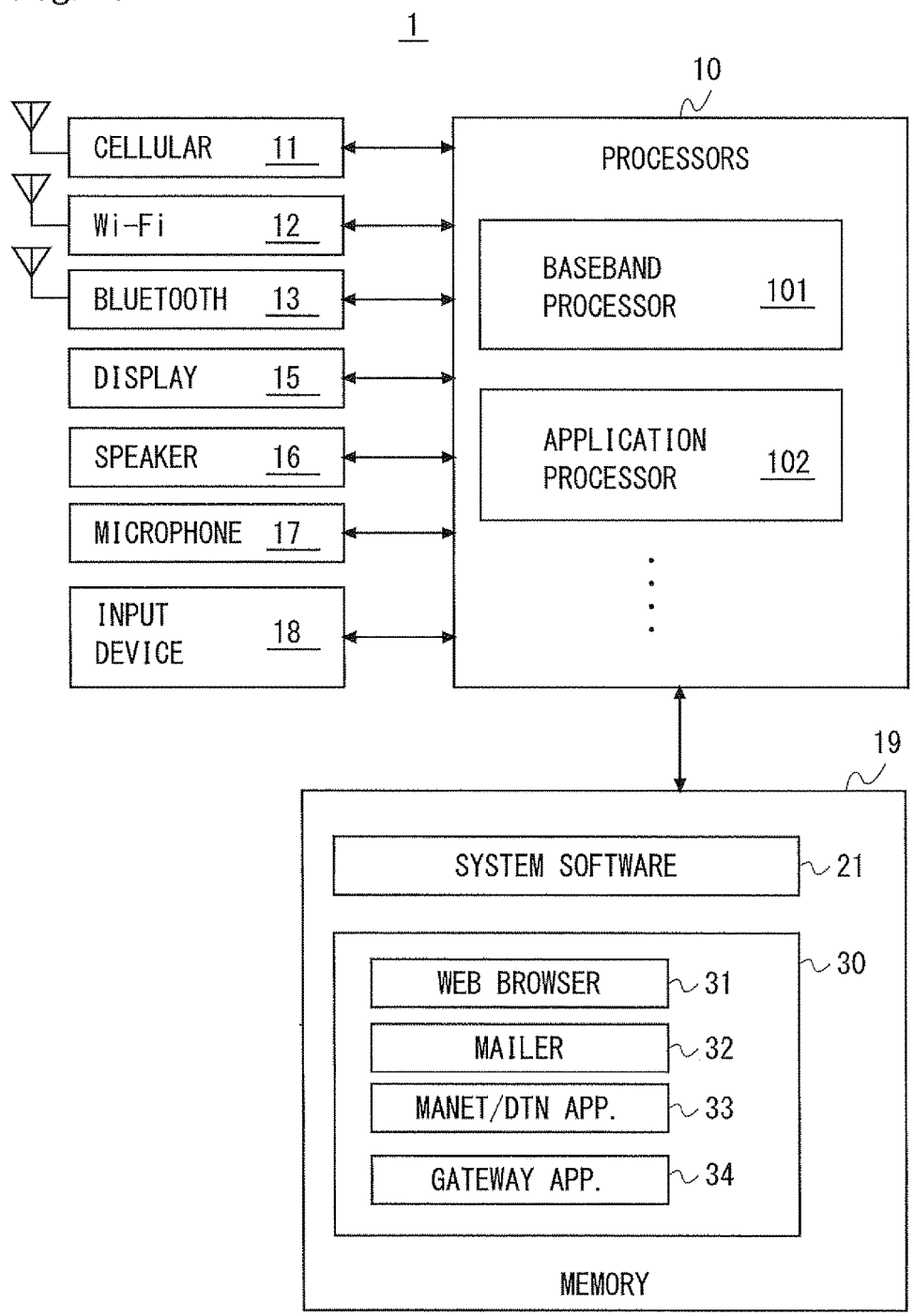
FIG. 1 is a block diagram showing a hardware configuration example of a wireless terminal according to a first embodiment.

FIG. 1 is a block diagram showing an example of a hardware configuration of a wireless terminal 1 according to this embodiment. The wireless terminal 1 is, for example, a smartphone, a tablet computer, or a notebook PC (personal computer). As shown in FIG. 1, the wireless terminal 1 includes wireless transceivers 11-13, processors 10, and a memory 19.

The wireless transceivers 11-13 support respective different wireless communication schemes and are connected to respective different wireless communication networks. Each of the wireless transceivers 11-13 includes, for example, an analog front end (AFE). That is, each of the wireless transceivers 11-13 is coupled to an antenna and is configured to receive wireless signals through the antenna and transmit wireless signals through the antenna. The wireless transceivers 11-13 may also be referred to as wireless interfaces. In the example shown in FIG. 1, the wireless transceiver 11 is connected to a cellular network 51 (e.g., W-CDMA/LTE, CDMA2000, Global System for Mobile communications (GSM) (registered trademark), mobile WiMAX (IEEE 802.16e-2005)). The wireless transceiver 12 is connected to a wireless local area network (WLAN), i.e., Wi-Fi network. The Wi-Fi network includes a Wi-Fi infrastructure network 52, which uses a Wi-Fi infrastructure mode, and a Wi-Fi ad-hoc/Wi-Fi direct (WFD) network 53, which can be used for the MANET and the DTN. The wireless transceiver 13 is connected to a Bluetooth ad-hoc network 54.

The processors 10 include, for example, a baseband processor 101 and an application processor 102. The baseband processor 101 provides connectivity to a wireless network in accordance with a wireless communication standard. That is, the baseband processor 101 performs error correction coding, rate matching, interleaving, modulation symbol mapping, band limitation or the like on transmission data, to thereby generate a transmission baseband signal. Further, the baseband processor 101 restores a reception data sequence from a reception baseband signal and performs error correction on the reception data sequence in accordance with the channel coding scheme used in the counterpart node (e.g., a base station, an access point, or another wireless terminal). Further, the baseband processor 101 performs a communication control including transmission and reception of control messages. The baseband processor 101 may also be referred to as a modem (e.g., a W-CMDA/LTE modem, a Wi-Fi modem, or a Bluetooth modem).

The application processor 102 loads a system software 21 and various applications 30 (e.g., a WEB browser, a mailer, a camera operation application, a music player application, and a video player application) from the memory 19 and executes these applications. The system software 21 includes an operating system and a middleware. The application processor 102 thereby provides various functions (e.g., a user interface, a software execution environment, and a user application) of the wireless terminal 1 (e.g., a smartphone or a tablet computer).

In one example, the applications 30 include a WEB browser 31, a mailer 32, a MANET/DTN application 33, and a gateway application 34. The WEB browser 31 and the mailer 32 may be pre-installed standard applications on the wireless terminal 1. The MANET/DTN application 33 is an application that explicitly uses one or both of the MANET and the DTN. The gateway application 34 enables other applications (including the WEB browser 31, the mailer 32, and the MANET/DTN application 33) to communicate via one or more wireless transceivers used for one or both of the MANET and the DTN.

Specifically, the application processor 102 performs the gateway application 34, whereby the wireless terminal 1 (the application processor 102) performs gateway processing. The gateway processing includes: (a) receiving transmission data of one or more applications (e.g., the WEB browser 31 and the mailer 32) included in the applications 30; (b) selecting, from a plurality of wireless interfaces (or wireless networks), at least one wireless interface (or wireless network) to which the transmission data is to be transmitted; and (c) transmitting the transmission data to the selected at least one wireless interface (or the wireless network). The details of the gateway processing in the wireless terminal 1 will be described later.

The processors 10 may include other processors and circuits not shown in FIG. 1, e.g., a graphics processor (graphics processing unit (GPU) for displaying images, a multimedia processor for encoding and decoding of high-definition (HD) videos or the like, a display controller for controlling a display, and a power management integrated circuit (IC) for controlling power supply and charging).

The baseband processor 101 may be, for example, a Digital Signal Processor (DSP), a microprocessor, a Micro-Processing Unit (MPU), or a Central Processing Unit (CPU). In a similar way, the application processor 102 may be a microprocessor, an MPU, or a CPU. Each of the baseband processor 101 and the application processor 102 may be physically formed on a single semiconductor chip or on a plurality of semiconductor chips. Instead, the processors 10, which include the baseband processor 101 and the application processor 102, may be integrated on a single semiconductor chip. Such an IC device is referred to as an SoC (system on a chip) device or a system LSI (large scale integration).

The memory 19 consists of a volatile memory and a non-volatile memory. The volatile memory is, for example, a static random access memory (SRAM), a dynamic RAM (DRAM), or any combination thereof. The non-volatile memory is, for example, a mask read only memory (MROM), a programmable ROM (PROM), a flash memory, a hard disc drive, or any combination thereof.

The wireless terminal 1 may include, besides the wireless transceivers 11-13, various devices coupled to the processors 10. As shown in FIG. 1, for example, the wireless terminal 1 includes a display 15, a speaker 16, a microphone 17, and an input device 18. The input device 18 is a device for accepting operations by a user. The input device 18 includes, for example, at least one of a device for accepting input operations manually performed by the user, a microphone for accepting sound input by the user, and a device for accepting an eye-gaze input by the user. The device for accepting input operations manually performed by the user is, for example, a keyboard, a keypad, a touch panel, a touch pad, or a mouse.

Figure 2:
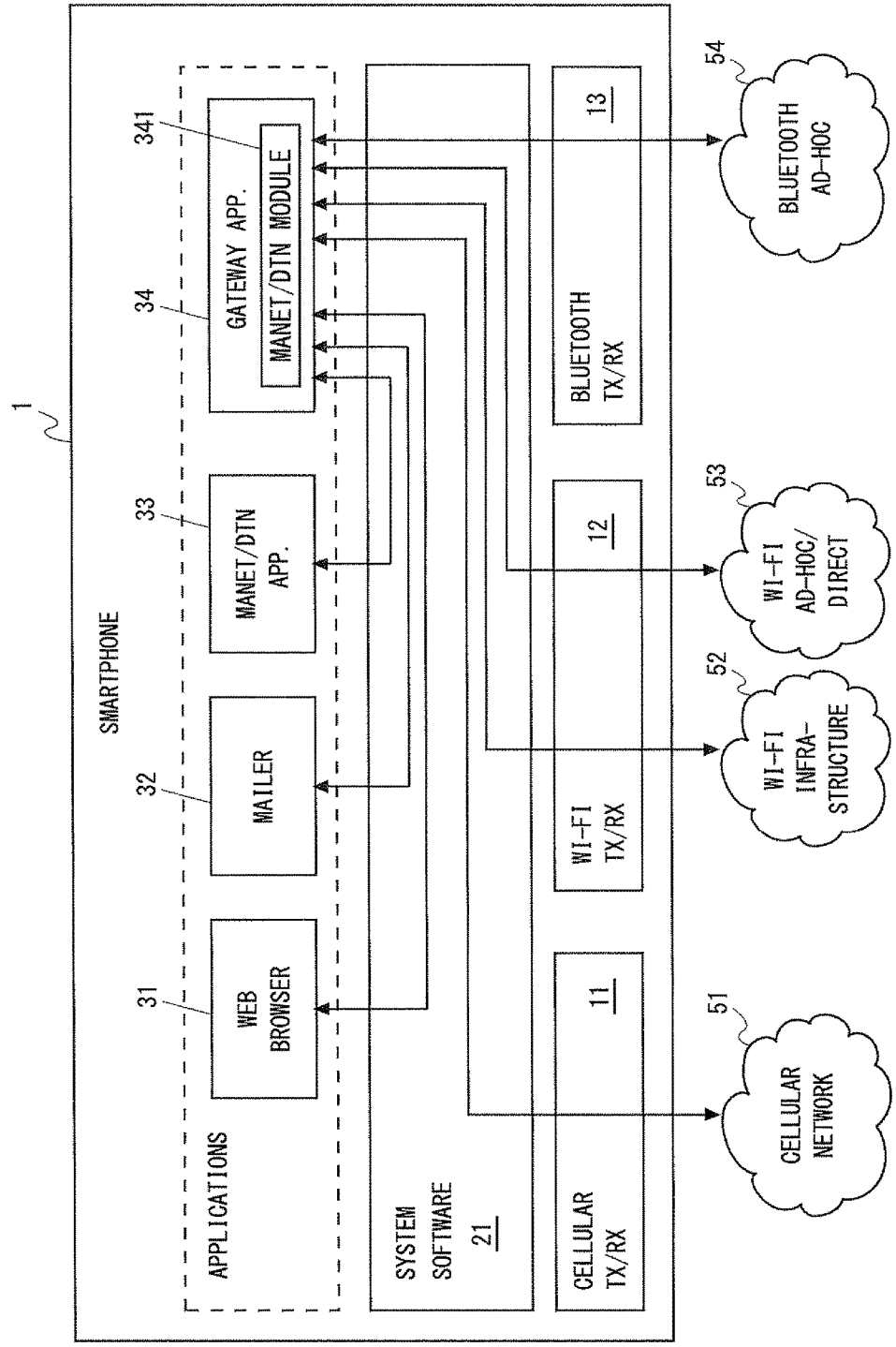
FIG. 2 is a block diagram showing a software configuration example of the wireless terminal according to the first embodiment.

The following provides specific examples of a software configuration of the wireless terminal 1. FIG. 2 is a block diagram showing one example of the software configuration of the wireless terminal 1 according to this embodiment.

As already stated above, when the gateway application 34 is loaded into a computer (application processor 102), the gateway application 34 causes the computer (application processor 102) to perform the gateway processing. The gateway processing includes: (a) receiving the transmission data of one or more applications (e.g., the WEB browser 31 and the mailer 32) included in the applications 30; (b) selecting, from the plurality of wireless interfaces (or wireless networks), at least one wireless interface (or wireless network) to which the transmission data is to be transmitted; and (c) transmitting the transmission data to the selected at least one wireless interface (or the wireless network). The gateway processing further includes receiving reception data to be received by another application program from at least one wireless interface (or a wireless network), and sending the reception data to the other application program.

The wireless interfaces may correspond one-to-one to the physical wireless transceivers. However, each physical wireless transceiver can be used for a plurality of wireless communication networks using different higher layer communication protocols. For example, as already stated above, the Wi-Fi transceiver 12 may support the Wi-Fi infrastructure mode, the Wi-Fi ad-hoc mode, and the Wi-Fi direct (WFD). The Wi-Fi infrastructure mode can be used for the wireless infrastructure network. The wireless infrastructure network provides persistent communications compared to the MANET and the DTN. On the other hand, the Wi-Fi ad-hoc mode and the WFD can be used for the MANET and the DTN. Further, the Bluetooth transceiver 13 can be used for the MANET and the DTN. That is, one physical wireless transceiver (e.g., the Wi-Fi transceiver 12) can correspond to a plurality of wireless interfaces (e.g., the Wi-Fi infrastructure mode, the MANET using the Wi-Fi ad-hoc mode, the DTN using the Wi-Fi ad-hoc mode, the MANET using the WFD, and the DTN using the WFD).

In order to receive transmission/reception data of the applications 31-33, the gateway application 34 may use an inter-program communication (e.g., an inter-process communication or an inter-thread communication) function provided by the system software 21. For implementing the inter-program communication function, some specific mechanisms, such as a pipe, a named pipe, a socket, and a message queue, are known. These known specific mechanisms can be used for the inter-program communication between the gateway application 34 and the applications 31-33 in this embodiment.

In place of, or in combination with, the inter-program communication, a proxy configuration in the wireless terminal 1 may be used. The proxy configuration may be performed collectively for the applications 31-33 by the system software 21. Instead, the proxy configuration may be performed separately for each of the applications 31-33. Further, multicast communication (IP multicast communication) may be used to allow the gateway application 34 to receive the transmission/reception data of the applications 31-33.

In order to select at least one wireless interface to which the transmission data of the other applications is to be transmitted, the gateway application 34 may apprehend characteristics of each of the wireless transceivers 11-13. The characteristics of each wireless transceiver include, for example, its Internet Protocol (IP) address or its line type (e.g., cellular, Wi-Fi, or Bluetooth), or both.

To transmit transmission data of another application to the selected wireless interface, the gateway application 34 may convert this transmission data into a data unit (i.e., a Protocol Data Unit (PDU)) corresponding to the selected wireless interface. When transmission data of another application is transmitted on the DTN, the gateway application 34 may add header information for the DTN to the transmission data and generate a PDU conforming to the DTN.

The gateway application 34 may perform a store-and-forward operation when the gateway application 34 transmits and receives data of another application using the DTN formed using the Wi-Fi transceiver 12 or the Bluetooth transceiver 13. That is, the gateway application 34 maintains a data buffer in the memory 19, stores data (i.e., DTN PDUs, messages, data bundles) to be transmitted via the Wi-Fi transceiver 12 or the Bluetooth transceiver 13 in the data buffer, and stores data that has received via the Wi-Fi transceiver 12 or the Bluetooth transceiver 13 in the data buffer. Then when the gateway application 34 contacts another wireless terminal via the Wi-Fi transceiver 12 or the Bluetooth transceiver 13, the gateway application 34 transmits the data stored in the data buffer in accordance with a routing protocol (e.g., an Epidemic algorithm or a Spray and Wait algorithm). The gateway application 34 may include a MANET/DTN module 341 in order to perform this store-and-forward operation conforming to the MANET/DTN. The MANET/DTN module 341 includes instructions (software codes) that, when executed by a computer implemented in the wireless terminal 1 (e.g., the application processor 102), causes the computer to perform the store-and-forward operation conforming to the MANET/DTN.

As can be understood from the above description, in the wireless terminal 1 according to this embodiment, the gateway application 34 is configured to receive transmission data of other applications such as the WEB browser 31 and the mailer 32 and to transmit the transmission data of these applications to an appropriate communication interface. The wireless terminal 1 according to this embodiment thus enables application programs such as the WEB browser 31 and the mailer 32 to easily communicate via a communication interface (i.e., communication path) conforming to a communication protocol (e.g., the MANET or the DTN) that is additionally installed on the wireless terminal 1.

Figure 3:
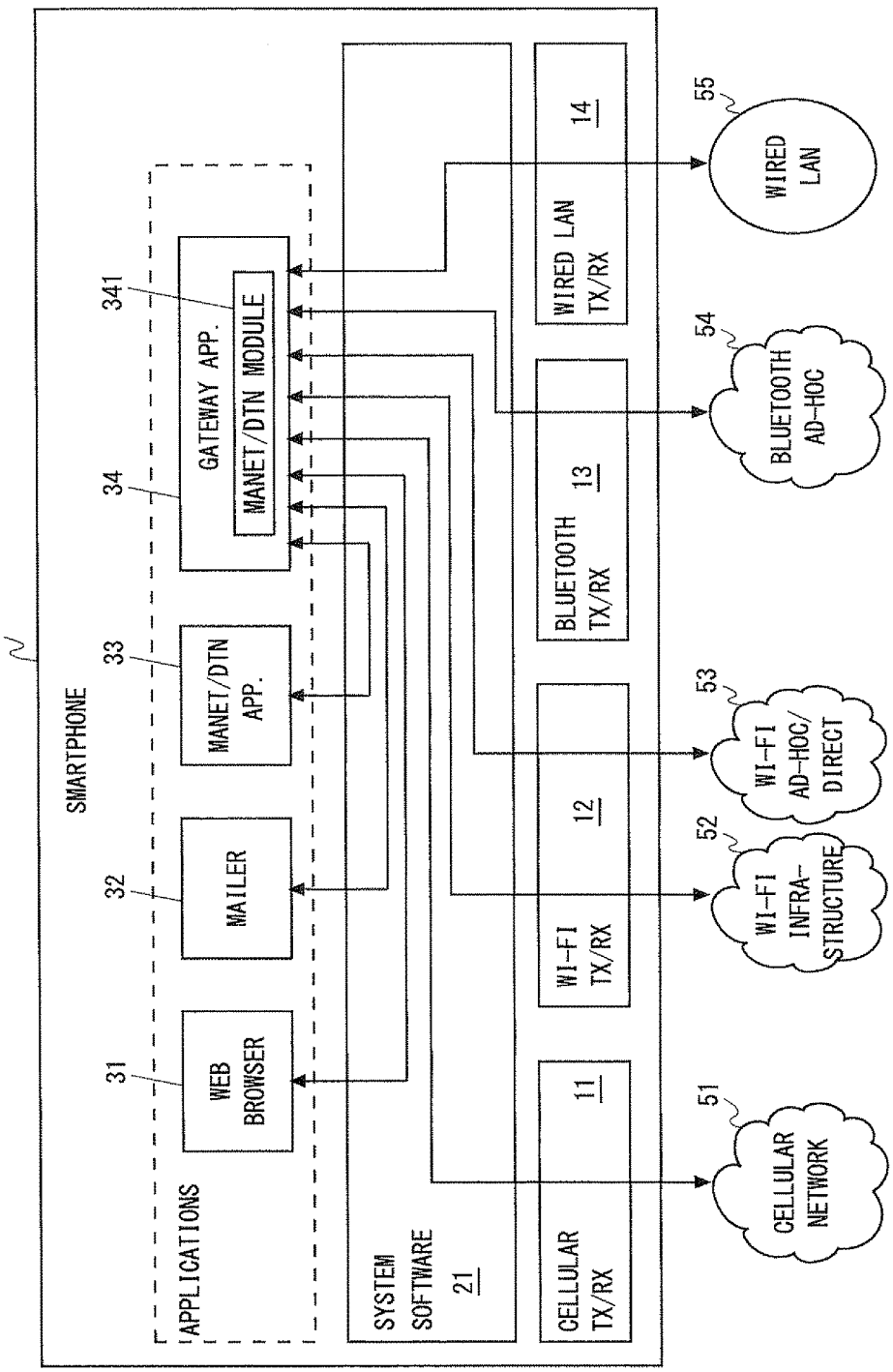
FIG. 3 is a block diagram showing a software configuration example of the wireless terminal according to the first embodiment.

FIG. 3 is a block diagram showing another example of the software configuration of the wireless terminal 1 according to this embodiment. In one example, the wireless terminal 1 may include a wired communication interface for connecting it to a wired communication network. The wired communication network is, for example, a wired LAN (IEEE802.3 series) or Universal Serial Bus (USB). The wired interface includes a transceiver for connecting it to the wired communication network (e.g., a wired LAN transceiver or a USB transceiver). In the example shown in FIG. 3, the wireless terminal 1 includes a wired LAN transceiver 14 for connecting it to a wired LAN 55.

In the example shown in FIG. 3, the gateway processing by the gateway application 34 may include (a) receiving transmission data of one or more applications (e.g., the WEB browser 31 and the mailer 32) included in the applications 30, (b) selecting, from the plurality of communication interfaces, at least one wireless interface (or wireless network) to which the transmission data is to be transmitted, and (c) transmitting the transmission data to the selected at least one communication interface (or the wireless network). The plurality of communication interfaces include one or more wireless interfaces each using a wireless transceiver (e.g., one of the wireless transceivers 11-13) and one or more wired interfaces each using a wired transceiver (e.g., the wired LAN transceiver 14).

Second Embodiment

There is a problem that commercially available smartphones cannot relay MANET/DTN traffic between different wireless interfaces (wireless communication schemes, wireless communication standards) such as W-CDMA/LTE, Wi-Fi infrastructure mode, Wi-Fi ad-hoc mode, and Bluetooth. A wireless terminal 2 according to this embodiment deals with this problem. A hardware configuration example of the wireless terminal 2 according to this embodiment is similar to that of the wireless terminal 1 shown in FIG. 1. FIG. 4 is a block diagram showing one example of a software configuration of the wireless terminal 2.

When a gateway application 44 is loaded into a computer (the application processor 102), the gateway application 44 causes the computer (the application processor 102) to perform the following gateway processing. In the gateway processing, the application processor 102 participates in a first DTN or MANET using a first wireless interface (e.g., WFD in the Wi-Fi transceiver 12) among a plurality of wireless interfaces available in the wireless terminal 2. Further, in the gateway processing, the application processor 102 participates in a second DTN or MANET using a second wireless interface (e.g., Bluetooth network in the Bluetooth transceiver 13). Furthermore, in the gateway processing, the application processor 102 relays data between the first DTN or MANET and the second DTN or MANET. The gateway application 44 may include a MANET/DTN module 441 to perform the store-and-forward operation conforming to the MANET/DTN. The MANET/DTN module 441 includes instructions (software codes) that, when executed by a computer implemented in the wireless terminal 2 (e.g., the application processor 102), cause the computer to perform the store-and-forward operation conforming to the MANET/DTN.

By executing the gateway application 44, the application processor 102 may relay data between two DTNs, between two MANETs, or between a DTN and a MANET, which use the same physical wireless transceiver. For example, the application processor 102 may relay data between the first DTN (or MANET) formed using the Wi-Fi ad-hoc mode in the Wi-Fi transceiver 12 and the second DTN (or MANET) formed using the WFD in the same Wi-Fi transceiver 12.

Further, the gateway application 44 may forward DTN/MANET data to the cellular network 51 or the Wi-Fi infrastructure network 52.

As can be understood from the above description, the gateway application 44 is configured to relay data between DTNs/MANETs that use different wireless transceivers or different wireless communication protocols. Accordingly, the wireless terminal 2 according to this embodiment is able to relay MANET/DTN traffic between different wireless interfaces (wireless communication schemes or wireless communication standards) such as W-CDMA/LTE, Wi-Fi infrastructure mode, Wi-Fi ad-hoc mode, and Bluetooth.

Similar to the example of the wireless terminal 1 shown in FIG. 3, the wireless terminal 2 according to this embodiment may include a wired communication interface for connecting it to a wired communication network. In this case, the gateway application 44 may relay data between DTNs/MANETs that use different wireless or wired transceivers or different wireless or wired communication protocols.

OTHER EMBODIMENTS

The gateway application 34 or 44 described in the first and second embodiments may not be able to simultaneously use a plurality of communication interfaces, for example in the case where these communication interfaces commonly use one physical wireless transceiver. Accordingly, the gateway application 34 or 44 may sequentially switch among a plurality of communication interfaces used for communication when these communication interfaces cannot be simultaneously used.

The first and second embodiments may be combined with each other.

The gateway applications 34 and 44 described in the first and second embodiments can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the embodiments stated above are merely examples regarding applications of technical ideas obtained by the present inventors. Needless to say, these technical ideas are not limited to the embodiments described above and may be changed in various ways.

This application is based upon and claims the benefit of priority from Japanese Patent Application No. 2014-228987, filed on Nov. 11, 2014, the disclosure of which is incorporated herein in its entirety by reference.

REFERENCE SIGNS LIST 1, 2 WIRELESS TERMINAL
10 PROCESSORS
11 CELLULAR TRANSCEIVER
12 WI-FI TRANSCEIVER
13 BLUETOOTH TRANSCEIVER
19 MEMORY
21 SYSTEM SOFTWARE
30 APPLICATIONS
31 WEB BROWSER
32 MAILER
33 MANET/DTN APPLICATION
34, 44 GATEWAY APPLICATION
51 CELLULAR NETWORK
52 WI-FI INFRASTRUCTURE NETWORK
53 WI-FI AD-HOC/WI-FI DIRECT NETWORK
54 BLUETOOTH AD-HOC NETWORK
55 WIRED LAN
341, 441 MANET/DTN MODULE

What is claimed is:

1. A wireless terminal comprising:
a plurality of communication interfaces;
at least one memory; and
at least one processor configured to load system software and first and second application programs from the at least one memory, execute the system software and the first and second application programs, and perform gateway processing by executing the first application program, wherein
the gateway processing comprises:
receiving transmission data of the second application program using an inter-program communication function provided by the system software;
converting the transmission data into a protocol data unit (PDU) corresponding to a disruption tolerant network (DTN);
selecting, from the plurality of communication interfaces, at least one communication interface to which the PDU is to be transmitted; and
sending the PDU to be transmitted to the at least one communication interface while conforming to the DTN.

2. The wireless terminal according to claim 1, wherein the sending comprises store-and-forwarding the PDU to be transmitted while conforming to the DTN.

3. The wireless terminal according to claim 1, wherein the selecting comprises selecting the at least one communication interface based on characteristics of the plurality of communication interfaces.

4. The wireless terminal according to claim 1, wherein the gateway processing further comprises:
receiving a PDU containing reception data to be received by the other application program from the at least one communication interface; and
sending the reception data to the other application program.

5. The wireless terminal according to claim 1, wherein the plurality of communication interfaces comprise first and second wireless interfaces, and
the gateway processing further comprises:
participating in a first disruption tolerant network (DTN) or a first mobile ad-hoc network (MANET) using the first wireless interface;
participating in a second disruption tolerant network (DTN) or a second mobile ad-hoc network (MANET) using the second wireless interface; and
relaying data between the first DTN or MANET and the second DTN or MANET.

6. The wireless terminal according to claim 1, wherein the wireless terminal is a smartphone.

7. The wireless terminal according to claim 1, wherein the plurality of communication interfaces comprise at least one wired interface.

8. A non-transitory computer readable medium storing a first application program that, when executed by a computer implemented in a wireless terminal, causes the computer to perform gateway processing, wherein the gateway processing comprises:
receiving transmission data of a second application program using an inter-program communication function provided by a system software, the second application program and the system software being executed by the same computer as the first application program;
converting the transmission data into a protocol data unit (PDU) corresponding to a disruption tolerant network (DTN);
selecting, from a plurality of communication interfaces that are available in the wireless terminal, at least one communication interface to which the PDU is to be transmitted; and
sending the PDU to be transmitted to the at least one communication interface while conforming to the DTN.

9. The non-transitory computer readable medium according to claim 8, wherein the sending comprises store-and-forwarding the PDU to be transmitted while conforming to the DTN.

10. The non-transitory computer readable medium according to claim 8, wherein the selecting comprises selecting the at least one communication interface based on characteristics of the plurality of communication interfaces.

11. The non-transitory computer readable medium according to claim 8, wherein the gateway processing further comprises:
receiving a PDU containing reception data to be received by the other application program from the at least one communication interface; and
sending the reception data to the other application program.

12. The non-transitory computer readable medium according to claim 8, wherein
the plurality of communication interfaces comprise first and second wireless interfaces, and
the gateway processing further comprises:
participating in a first disruption tolerant network (DTN) or a first mobile ad-hoc network (MANET) using the first wireless interface;
participating in a second disruption tolerant network (DTN) or a second mobile ad-hoc network (MANET) using the second wireless interface; and
relaying data between the first DTN or MANET and the second DTN or MANET.

13. The non-transitory computer readable medium according to claim 8, wherein the wireless terminal is a smartphone.

14. A method performed by a computer implemented in a wireless terminal upon executing, by the computer, a first application program, the method comprising:
receiving transmission data of a second application program using an inter-program communication function provided by a system software, the second application program and the system software being executed by the same computer as the first application program;

converting the transmission data into a protocol data unit (PDU) corresponding to a disruption tolerant network (DTN);

selecting, from a plurality of communication interfaces that are available in the wireless terminal, at least one communication interface to which the PDU is to be transmitted; and sending the PDU to be transmitted to the at least one communication interface while conforming to the DTN.

15. The method according to claim 14, wherein the sending comprises store-and-forwarding the PDU to be transmitted while conforming to the DTN.

16. The method according to claim 14, wherein the selecting comprises selecting the at least one communication interface based on characteristics of the plurality of communication interfaces.

17. The method according to claim 14, wherein the method further comprises:

receiving a PDU containing reception data to be received by the other application program from the at least one communication interface; and sending the reception data to the other application program.

* * * * *